United States Patent [19]
Sheen et al.

[11] Patent Number: 5,530,088
[45] Date of Patent: Jun. 25, 1996

[54] HEAT RESISTANT PHOSPHORUS-CONTAINING POLYMERIC FLAME RETARDANT AND PROCESS FOR PREPARING THE SAME

[75] Inventors: Yuung-Ching Sheen, Tainan Hsien; Shinn-Jen Chang, Hsinchu; Yi-Ni Cheng, Taipei; Rong-Shuh Chang, Hsinchu, all of Taiwan

[73] Assignee: Industrial Technology Research Institute, Hsinchu, Taiwan

[21] Appl. No.: 492,748

[22] Filed: Jun. 21, 1995

[51] Int. Cl.$^6$ .................... C08G 63/692; C08G 79/02
[52] U.S. Cl. .................... 528/287; 528/272; 528/275; 528/279; 528/281; 528/283; 528/284; 528/285; 528/286; 528/298; 528/300; 528/302; 528/307; 528/308; 528/308.6; 528/503
[58] Field of Search .................... 528/272, 275, 528/279, 281, 283, 284, 285, 286, 287, 298, 300, 302, 307, 308, 308.6, 503

[56] References Cited

U.S. PATENT DOCUMENTS 4,127,590  11/1978  Endo et al. .................... 260/346.74
4,157,436   6/1979  Endo et al. .................... 528/167

*Primary Examiner*—Samuel A. Acquah
*Attorney, Agent, or Firm*—Sughrue, Mion, Zinn, Macpeak & Seas

[57] ABSTRACT

A heat resistant phosphorus-containing polymeric flame retardant and a process for preparing the same are disclosed. The process is characterized in that in polycondensation a selected metal salt serving as cocatalyst is used to catalyze a phosphorus-containing compound, a saturated dicarboxylic acid or the derivatives thereof, and a diol to form a high phosphorus content, high molecular weight flame retardant. The selected metal salts can promote the polymerization of phosphorus-containing compounds and polyester, and can inhibit side reactions and depolymerization so as to increase the phosphorus content of the resulting products and reduce the manufacturing cost. The flame retardants thus prepared can endure processing at an elevated temperature and thus are suitable for being applied in flame retardant fibers, fabrics, nonwoven fabrics, adhesives, and plastics.

17 Claims, 2 Drawing Sheets

HEAT RESISTANT PHOSPHORUS-CONTAINING POLYMERIC FLAME RETARDANT AND PROCESS FOR PREPARING THE SAME

BACKGROUND OF THE INVENTION

The present invention relates to a heat resistant phosphorus-containing polymeric flame retardant and process for preparing the same.

Flame-retardant polymeric materials can be obtained by copolymerizing flame retardants into polymer molecular structures, or by blending polymers with flame retardants. By using copolymerization method, although permanent flame retardancy is obtainable, other physical properties of the polymeric materials are degraded and the manufacturing cost is high. A blending method has the advantages of easy processing and low manufacturing cost. Moreover, other additives such as thermal stabilizers and antistatic agents can also be blended with the polymeric materials. However, the flame retardants easily migrate to the surface of the fabricated products and then disappear, thus the flame retardancy is short-lived. Moreover, due to the poor compatability of flame retardants with polymeric materials and poor dispersity, when the amount of flame retardants to be added is large, their physical properties of the resulting polymeric materials are often deteriorated.

Although known phosphate flame retardants contain high content of phosphorus, their molecular weight is generally less than 2000, and thus have poor heat resistance. Their thermal decomposition temperature ($T_d$) is lower than 300° C., and the weight loss (280° C., 3 min, under $N_2$) is larger than 1%. Thus this kind of flame retardant is not suitable for being processed at an elevated temperature. Phosphorus-containing polyesters having a molecular weight larger than 30,000 can be made, however, as phosphorus will inhibit the esterification and condensation reactions, unsually, the phosphorus content thereof is less than 1%. This phosphorus-containing polyester can only be used directly, and is not suitable for adding to other polymeric materials as a flame retardant.

SUMMARY OF THE INVENTION

It is therefore an object of the invention to provide a flame retardant which is suitable for blending with other polymeric materials, has high molecular weight, high phosphorus content and superior heat resistance and flame retardancy.

The above object of the invention is achieved by subjecting a phosphorus-containing compound, a dicarboxylic acid or the derivatives thereof, and a diol to esterification reaction in the presence of an esterification catalyst to form a polyester, followed by polycondensing the polyester in the presence of a polycondensation catalyst and a selected cocatalyst. The selected cocatalyst is a metal salt which can aid the polycondensation catalyst: in polycondensation capability so as to promote the polymerization of phosphorus-containing compounds and polyester, and can inhibit side reactions and depolymerization so as to avoid the loss of phosphorus, making the conversion of phosphorus be larger than 98%.

The flame retardants thus prepared have a phosphorus content up to 5%, a molecular weight larger than 10,000, a thermal decomposition temperature higher than 400° C., and a weight loss (290° C., 3 min, under $N_2$) less than 1%. The flame retardants also have good comparability with polyesters and polyamides and good processing properties at an elevated temperature, are of low toxicity and migration.

BRIEF DESCRIPTION OF THE DRAWINGS

The present invention can be more completely understood by reference to the following detailed descriptions and accompanying drawings, which form an integral part of this application.

DETAILED DESCRIPTION OF THE INVENTION

Figure 1:
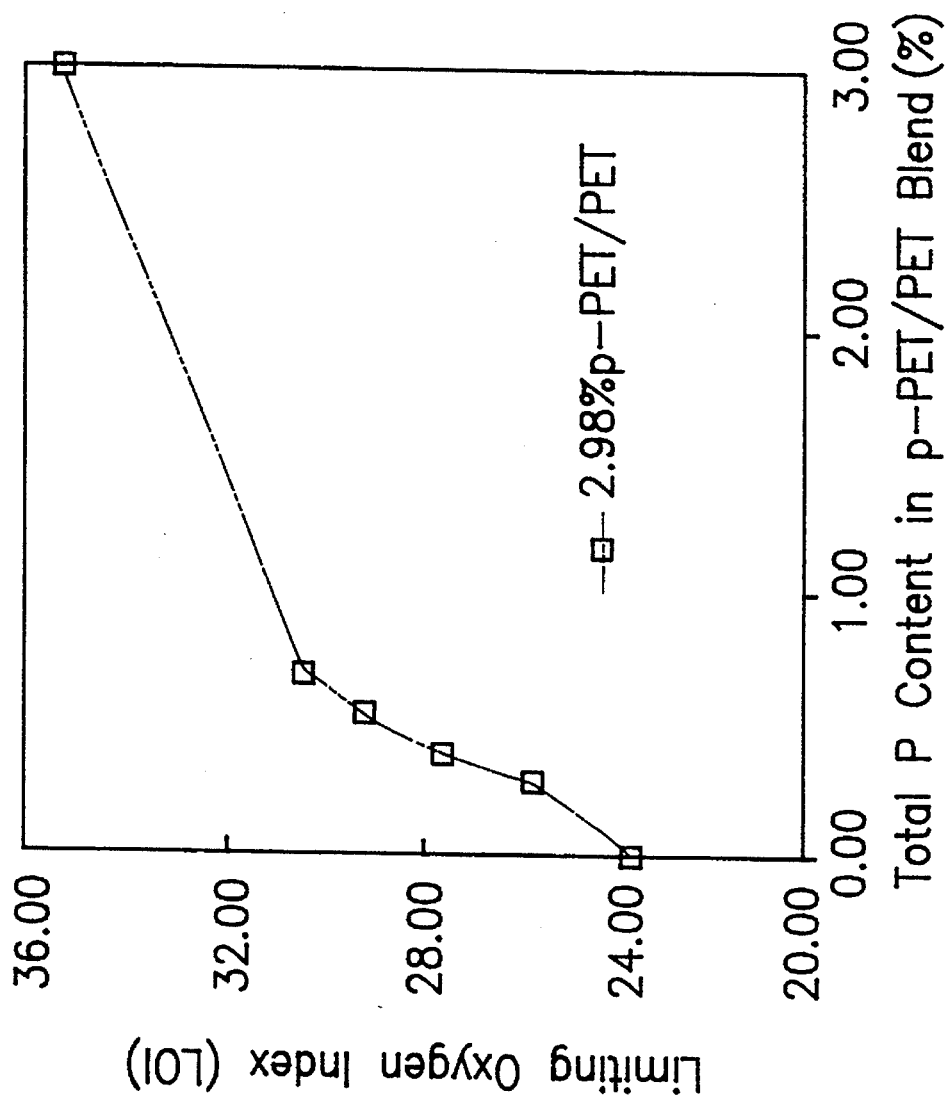
FIG. 1 is a plot showing the relationship of LOI with total P content in p-PET/PET blend in applied Example 1.

According to the process of the invention, the esterification is conducted by reacting selected phosphorus-containing compounds, dicarboxylic acids or the derivatives thereof, and diols at a temperature of 150°–250° C., preferably at 180°–220° C. in the presence of an esterification catalyst. When the conversion of the esterification achieves 90%, preferably 95%, selected polycondensation catalysts and cocatalysts are added, and the reaction temperature is raised to 250° C.–300° C., preferably 265° C.–280° C. and the pressure is evacuated to less than 1 torr to initiate the polycondensation to form the flame retardants. Note that, according to the process, the molar ratio of dicarboxylic acid to diol is 1.0:1.05 to 1.0:10.0, preferably 1.0:1.3 to 1.0:6.0; and the amount of the cocatalyst is 0.02–0.2 mol %, preferably 0.05–0.12 mole % based on the amount of the dicarboxylic acid.

The phosphorus-containing compounds have the structure (I):

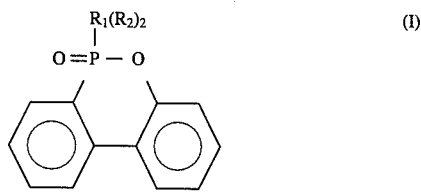

wherein $R_1$ is a $C_1$–$C_8$ alkylene, $R_2$ is —$COOR_3$ or —$OR_4$ where $R_3$ and $R_4$ are respectively hydrogen or a $C_1$–$C_2$ alkyl. The amount of the phosphorus-containing compounds is 3 mol %–85 mole % based on the dicarboxylic acid or the derivatives thereof. Specific and preferred examples of these phosphorus-containing compounds are as follows:

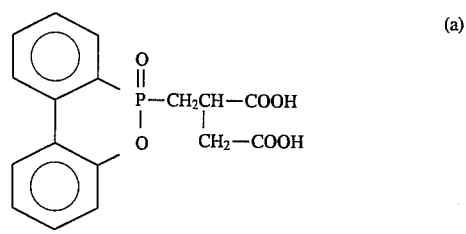

(b) 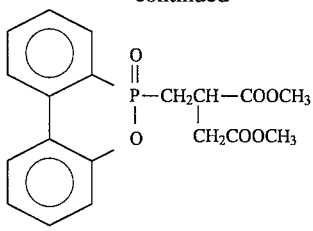

(c) 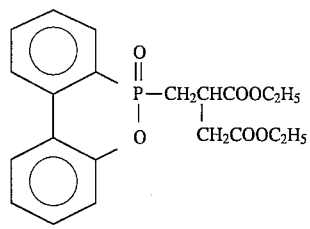

(d) 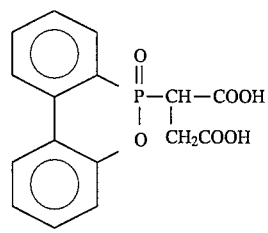

(e) 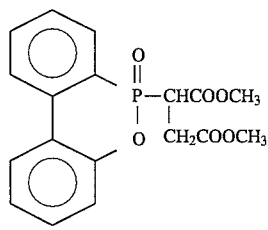

(f) 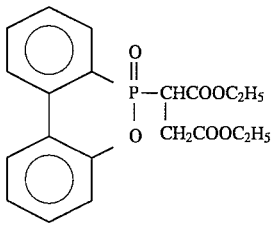

(g) 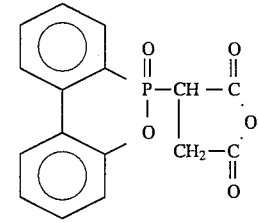

(h) 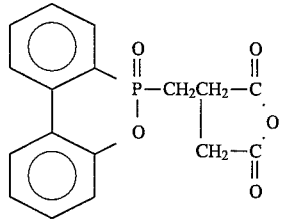

(i) 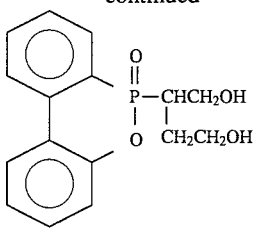

(j) 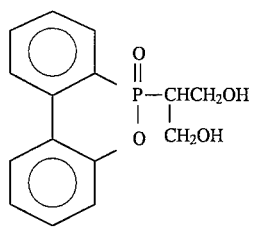

(k) 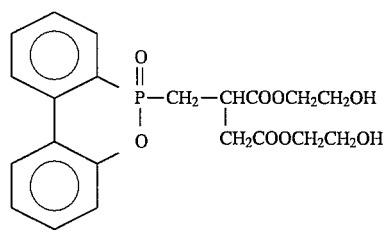

(l) 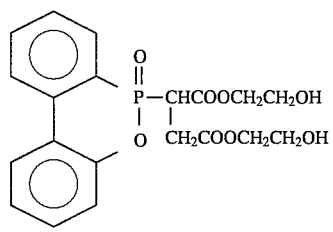

Dicarboxylic acids or the derivatives suitable for use in this invention include but are not limited to terephthalic acid, dimethyl terephthalate, isophthalic acid, adipic acid, sebacic acid, azelaic acid, dodecane dicarboxylic acid, phthalic anhydride, naphthalic acid, sodium salt of dimethyl, 5-sulfo-isophthalate.

Diols suitable for use in this invention include but are not limited to ethylene glycol, propene glycol, 1,4-butene diol, 1,6-hexane diol, 1,4-cyclohexane diol, neopentyl glycol, 1,4-cyclohexane dimethane diol and polyethylene ether glycol.

Esterification catalysts and polycondensation catalysts suitable for use in this invention are metal compounds, such as metal oxides or metal salts, wherein the metal includes Zn, Mn, Ti, Mg, Ca, Pb, Sn, Ge and Sb. The amount of the esterification catalysts and polycondensation catalysts is 0.05 wt %–0.4 wt % based on the dicarboxylic acid or the derivatives.

The cocatalysts used in the polycondensation are phosphonates, phosphates and carboxylates of alkali metals, alkaline earth metals and ammonium, or the mixtures thereof, and can be respectively represented by the formulas: $RPO_3M$, $MPO_4$ and $R(COO)_nM$ wherein R is a $C_1$–$C_{18}$ alkyl or $C_6$–$C_{12}$ aryl, M is an alkali metal, an alkaline earth metal or an ammonium, n is an integer of 1–4. Specific examples of these cocatalysts are sodium phosphonate, potassium phosphonate, ammonium phosphonate, sodium phosphate, potassium phosphate.

The examples which follow illustrate in detail the invention. In these examples, parts and percents are all measured by weights. The intrinsic viscosities were measured in a 3/2 solvent mixture of phenol and 1,1,2,2-tetracloro ethane at 30° C. The phosphorus contents were obtained by heating samples in a mixture of sulfuric acid and perchloric acid to decompose, developing their colors by using ammonium molybdate and ammonium ferric sulfate, and measured by a colorimetric method. The acid values were obtained by dissolving samples in a 3/2 solvent mixture of phenol and chloroform, and titrated with 0.1N KOH/phenyl alcohol solution using phenol red as an indicator. $T_m$ and $T_g$ were obtained by heating 5–8 mg of samples in a Du Pont 990 DSC in which the temperature was raised from −40° C. to 300° C. at a rate of 20° C./min. The thermal stability was indicated by the percent of weight loss of samples at 290° C. in a Du Pont TGA 990 microbalance in which 80 mg of samples were first heated from −40° C. to 100° C. at a rate of 100° C./min during 30 minutes, and then heated to 290° C. at the same heating rate during 30 minutes. Heat resistance was also measured by using a Du Pont 990 TGA microbalance, in which the samples were heated from room temperature to 880° C. at a heating rate of 20° C./min. Flame retardancy was indicated by LOI (Limiting Oxygen Index), and the LOI of each samples were measured according to the test standard of ASTM D2863. The percent of phosphorus incorporated into the polymer chains was confirmed and measured by using a $^{31}$P-NMR.

EXAMPLE 1

To a four-neck reaction flask fitted with a stirrer, a distillation tube, and a nitrogen inlet valve, were added 382 g of terephthalic acid, 248 g of ethylene glycol, 0.382 g of calcium acetate and 69.2 g of phosphorus-containing compound (a). The temperature was then raised to 180°–200° C. for esterification for about 2 hours. 0.38 g of $Na_3PO_4$ and 0.19 g of antimonous oxide, was then added, and the temperature was raised to 280° C. and reaction flask was gradually evacuated to 0.2 torr within 50 minutes, and the reaction continued under these conditions for 2 hours to give a phosphorus-containing polymeric flame retardant. The flame retardant had a phosphorus content of 1.2%, an acid value of 23 meg/Kg, an instrinic viscosity of 0.65, a thermal decomposition temperature of 455° C., a weight loss at 290° C., 3 min under $N_2$ of 0.1% and an LOI of 33.2. 98% of phosphorus was incorporated into the flame retardant molecular structure. The resulting flame retardant exhibited good heat resistance, thermal stability and flame retardancy.

EXAMPLE 2

To the reaction flask as described in Example 1, were added 413 g of Dimethyl terephthalate (DMT), 248 g of ethylene glycol, 0.41 g of zinc acetate and 138 g of phosphorus-containing compound (b). The temperature was then raised to 180°–200° C. for esterification for about 2 hours. 0.41 g of $K_3PO_4$ and 0.21 g of PbO was then added, and the temperature was raised to 280° C. and the reaction flask was gradually evacuated to 0.2 torr within 50 minutes, and the reaction continued under thes conditions for 2 hours to give a phosphorus-containing polymeric flame retardant. The flame retardant had a phosphorus content of 2%, an acid value of 27 meg/Kg, an instrinic viscosity of 0.68, an thermal decomposition temperature of 460° C., a weight loss at 290° C., 3 min under $N_2$ of 0.1% and a LOI of 34.5. 99% of the phosphorus was incorporated into the flame retardant molecular structure. The resulting flame retardants exhibited good heat resistance, thermal stability and flame retardancy.

EXAMPLE 3

To the reaction flask as described in Example 1, were added 322.8 g of terephthalic acid, 300 g of ethylene glycol, 0.3 g of zinc acetate and 223 g of phosphorus-containing compound (c). The temperature was then raised to 180°–200° C. for esterification for about 2 hours. 0.3 g of $Na_3PO_4$ and 0.3 g of tin oxide was then added, and the temperature was raised to 270° C. and the reaction flask was gradually evacuated to 0.2 torr within 60 minutes, and the reaction continued under these conditions for 3 hours to give a phosphorus-containing polymeric flame retardant. The resulting flame retardant had a phosphorus content of 2.95%, an acid value of 30 meg/Kg, an instrinic viscosity of 0.64, a thermal decomposition temperature of 462° C., a weight loss at 290° C., 3 min under $N_2$ of 0.2% and a LOI of 35.2. 98.3% of phosphorus was incorporated into the flame retardant molecular structure. The resulting flame retardants exhibited good heat resistance, thermal stability and flame retardancy.

EXAMPLE 4

The same materials and reaction conditions as described in Example 3 were repeated except that 192 g of phosphorus-containing compound (a) was used. The resulting flame retardant had a phosphorus content of 2.98%, an acid value of 28 meg/Kg, an instrinic viscosity of 0.67, a thermal decomposition temperature of 450° C., a weight loss at 290° C., 3 min under $N_2$ of 0.15% and a LOI of 35. 99% of phosphorus was incorporated into the flame retardant molecular structure. The resulting flame retardants exhibited good heat resistance, thermal stability and flame retardancy.

EXAMPLE 5

The same materials and reaction conditions as described in Example 3 were repeated except that 184 g of phosphorus-containing compound (d) was used. The resulting flame retardant had a phosphorus content of 2.91%, an acid value of 35 meg/Kg, an instrinic viscosity of 0.63, a thermal decomposition temperature of 440° C., a weight loss at 290° C., 3 min under $N_2$ of 0.3% and an LOI of 35. 97% of phosphorus was incorporated into the flame retardant molecular structure. The resulting flame retardants exhibited good heat resistance, thermal stability and flame retardancy.

EXAMPLE 6

To the reaction flask as described in Example 1, were added 277 g of terephthalic acid, 387 g of ethylene glycol, and 0.28 g of zinc acetate. The temperature was then raised to 180°–230° C. for 2 hours, and 288 g of phosphorus-containing compound (a) was then added, and allowed to react at 190°–210° C. for 2 hours. 0.3 g of $Na_3PO_4$ and 0.3 g of tin oxide was then added, and the temperature was raised to 260° C. and the reaction flask was gradually evacuated to 0.2 torr within 75 minutes, and the reaction continued under these conditions for 4.5 hours to give phosphorus-containing polymeric flame retardant. The resulting flame retardant had a phosphorus content of 3.95%, an acid value of 33 meg/Kg, an instrinic viscosity of 0.52, a thermal decomposition temperature of 400° C., a weight loss at 290° C., 3 min under $N_2$ of 0.6% and an LOI of 35.5. 98.8% of phosphorus was incorporated into the flame retardant molecular structure. The resulting flame retardants exhibited good heat resistance, thermal stability and flame retardancy.

EXAMPLE 7

The same materials and reaction conditions as described in Example 3 were repeated except that 415.2 g of phosphorus-containing compound (d) was used and the polymerization time was increased to 5.5 hours. The resulting flame retardant had a phosphorus content of 4.9%, an acid value of 40 meg/Kg, an instrinic viscosity of 0.32, a thermal decomposition temperature of 380° C., a weight loss at 290° C., 3 min under $N_2$ of 0.8% and a LOI of 35. 98% of phosphorus was incorporated into the flame retardant molecular structure. The resulting flame retardant exhibited good heat resistance, thermal stability and flame retardancy.

COMPARATIVE EXAMPLE 1

The same materials and reaction conditions as described in Example 5 were repeated except that no cocatalyst was added. The resulting flame retardant had a phosphorus content of 2.15%, an instrinic viscosity of 0.2, a thermal decomposition temperature of 320° C., a weight loss at 290° C., 3 min under $N_2$ of 3.5% and a LOI of 34. Only 71.7% of phosphorus was incorporated into the flame retardant molecular structure. The resulting flame retardant was an oligomer flame retradant.

COMPARATIVE EXAMPLE 2

The same materials and reaction conditions as described in Example 6 were repeated except that no cocatalyst was added. The resulting flame retardant had a phosphorus content of 2.84%, an instrinic viscosity of 0.15, a thermal decomposition temperature of 300° C., a weight loss at 290° C., 3 min under $N_2$ of 5.6% and a LOI of 33.4. Only 71% of phosphorus was incorporated into the flame retardant molecular structure. The resulting flame retardant was an oligomer flame retradant.

Some properties of the flame retardants of Examples 1 and Comparative Examples 1–2 are summarized in Table 1 below.

TABLE 1

| Example No. | Cocatalyst | Phosphorus content (%) | Phosphorus conversion (%) | I.V. | Decomposition Temperature (°C.) | Weight Loss (%) | LOI |
| --- | --- | --- | --- | --- | --- | --- | --- |
| 1 | Yes | 1.2 | 98 | 0.65 | 455 | 0.1 | 33.2 |
| 2 | Yes | 2 | 99 | 0.68 | 460 | 0.1 | 34.5 |
| 3 | Yes | 2.95 | 98.3 | 0.64 | 462 | 0.2 | 35.2 |
| 4 | Yes | 2.98 | 99 | 0.67 | 450 | 0.15 | 35 |
| 5 | Yes | 2.91 | 97 | 0.63 | 440 | 0.3 | 35 |
| 6 | Yes | 3.95 | 98.8 | 0.52 | 400 | 0.6 | 35.5 |
| 7 | Yes | 4.9 | 98 | 0.32 | 380 | 0.8 | 35. |
| Comparative Example 1 | No | 2.15 | 71.7 | 0.2 | 320 | 3.5 | 34 |
| Comparative Example 2 | No | 2.84 | 71 | 0.15 | 300 | 5.6 | 33.4 |

APPLIED EXAMPLE 1

139 g, 192 g, 250 g, 313 g and 380 g of polymeric flame retardants prepared by Example 4 were respectively blended with 1250 g of PET resins. The phosphorus contents of each blend were 0.3%, 0.4%, 0.5%, 0.6%, and 0.7%. LOI of each blends were measured by the same method and the results are summarized in Table 2 and shown in FIG. 1.

TABLE 2

|  | blank | A | B | C | D | E |
| --- | --- | --- | --- | --- | --- | --- |
| amount of the flame retardants (g) | 0 | 139 | 192 | 250 | 313 | 380 |
| Phosphorus content (%) | 0 | 0.3 | 0.4 | 0.5 | 0.6 | 0.7 |
| LOI | 22 | 25.7 | 28 | 28.5 | 29.5 | 30.5 |

APPLIED EXAMPLE 2

Figure 2:
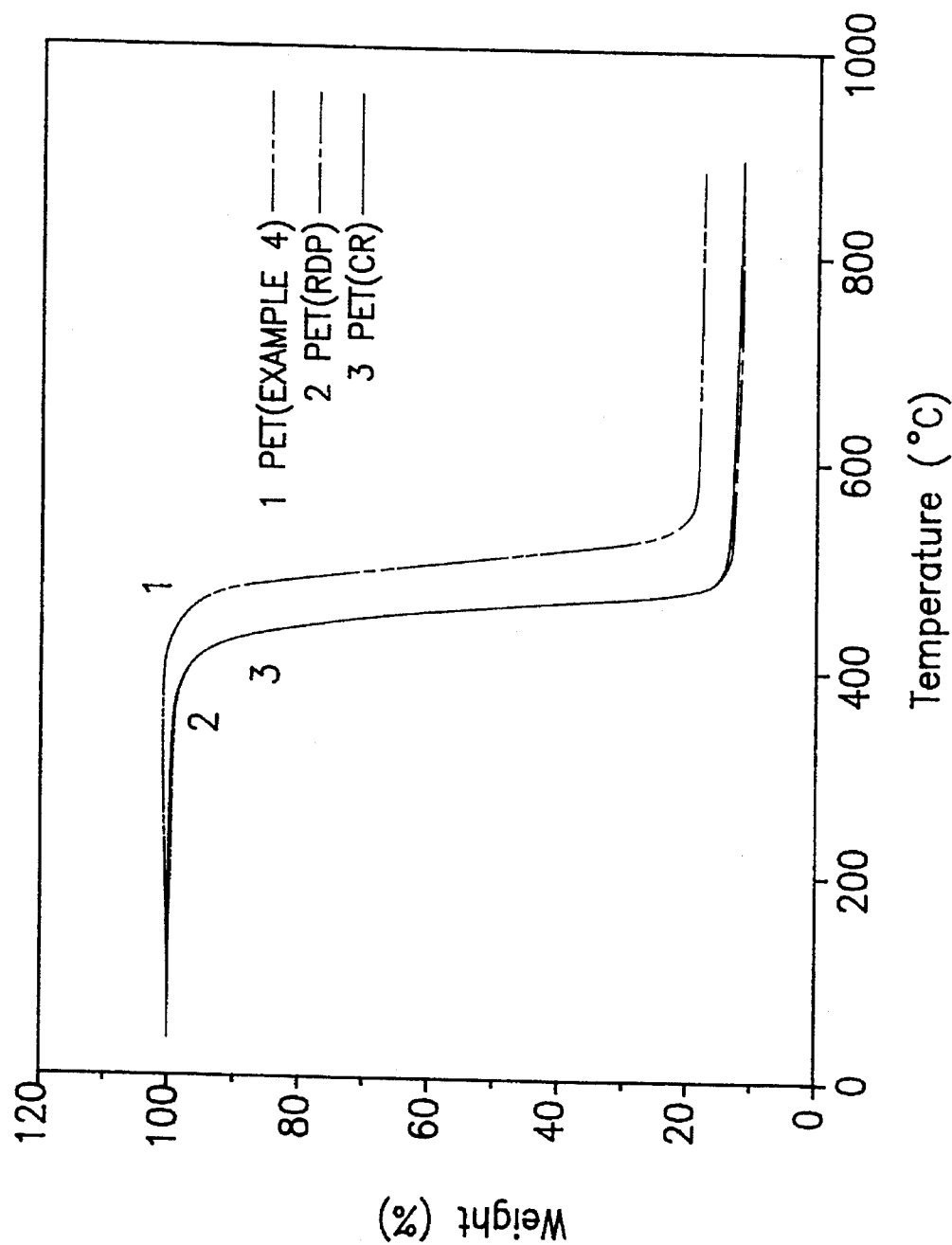
FIG. 2 is a plot showing the flame retarding effects of various polyesters in terms of weight loss.

Polymeric flame retardants prepared by Example 4 and flame retardants RDP (AKZO Co., Ltd.) and CR-733 (Daihachi Chemical Industry Co., Ltd.) were respectively blended with PET resins to obtain blends containing 0.7% of phosphorus. The LOI, HDT and $T_d$ of each were measured by the same method and the results are summarized in Table 3. The weight loss of each was also measured and was shown in FIG. 2.

TABLE 3

|  | Flame retardant of Example 4 | RDP | CR-733 |
|---|---|---|---|
| phosphorus content (%) | 0.7 | 0.7 | 0.7 |
| LOI | 30.5 | 27 | 28 |
| Heat detortion temperature (HDT, °C.) | 79 | 69 | 69 |
| Decomposition temperature ($T_d$, °C.) | 450 | 407 | 399 |

Note:
the structures of RDP and CR-733 are as follows:
RDP

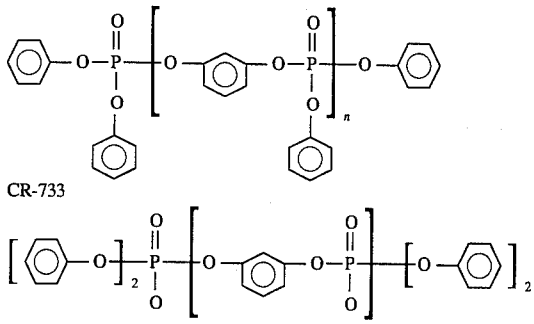

CR-733

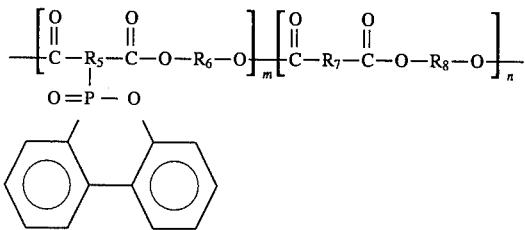

What is claimed is:

1. A process for preparing a heat resistant phosphorus-containing polymeric flame retardant having the formula:

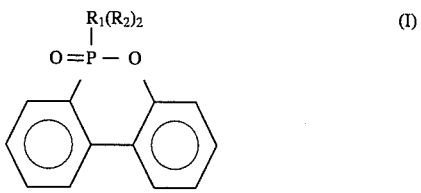

wherein $R_5$ is a $C_2$-$C_8$ alkylene or arylene, $R_6$ is a $C_2$-$C_{10}$ alkylene, $R_7$ is a $C_2$-$C_{10}$ alkylene or arylene, $R_8$ is a $C_2$-$C_{10}$ alkylene, m is an integer of 1–10, and n is an integer of 1–10, comprising the following steps:

(a) subjecting
 (i) a phosphorus-containing compound having the formula (I):

$$\begin{array}{c} R_1(R_2)_2 \\ | \\ O=P-O \end{array}$$ (I)

[benzene ring structure]

wherein $R_1$ is a $C_1$-$C_8$ alkylene, $R_2$ is a —COOR$_3$ or —OR$_4$ where $R_3$ and $R_4$ are respectively hydrogen or a $C_1$-$C_2$ alkyl,
 (ii) a dicarboxylic acid or an anhydride or an ester thereof, and
 (iii) a diol to an esterification reaction in the presence of an esterification catalyst to form a polyester; and (b) polycondensing the polyester in the presence of a polycondensation catalyst and a cocatalyst which is a compound having the formula RPO$_3$M, MPO$_4$ or R(COO)$_n$M wherein R is a $C_1$-$C_{18}$ alkyl or, a $C_8$-$C_{12}$ aryl, M is an alkali metal, an alkaline earth metal or an ammonium, n is an integer of 1–4 or a mixture thereof.

2. The process as claimed in claim 1, wherein said dicarboxylic acid or the anhydride or ester thereof is selected from the group consisting of terephthalic acid, dimethyl terephthalate, isophthalic acid, adipic acid, sebacic acid, azelaic acid, dodecane dicarboxylic acid, phthalic anhydride, naphthalic acid, and the sodium salt of dimethyl 5-sulfo-isophthalate.

3. The process as claimed in claim 1, wherein said diol is selected from the group consisting of ethylene glycol, propene glycol, 1,4-butene diol, 1,6-hexane diol, 1,4-cyclohexane diol, neopentyl glycol, 1,4-cyclohexane dimethane diol and polyethylene ether glycol.

4. The process as claimed in claim 1, wherein said esterification catalyst is a metal compound, wherein said metal is selected from the group consisting of Zn, Mn, Ti, Mg, Ca, Pb, Sn, Ge and Sb.

5. The process as claimed in claim 4, wherein the amount of said esterification catalyst is 0.05 wt %–0.4 wt % based on the dicarboxylic acid or the anhydride or ester thereof.

6. The process as claimed in claim 1, wherein said polycondensation catalyst is a metal oxide, wherein said metal is selected from the group consisting of Zn, Mn, Ti, Mg, Ca, Pb, Sn, Ge and Sb.

7. The process as claimed in claim 6, wherein the amount of said polycondensation catalyst is 0.05 wt %–0.4 wt % based on the dicarboxylic acid or the anhydride or ester thereof.

8. The process as claimed in claim 1, wherein the amount of the phosphorus-containing compund is 3 mol %–85 mol % based on the dicarboxylic acid or the anhydride or ester thereof.

9. The process as claimed in claim 1, wherein the amount of the cocatalyst is 0.02–0.2 mol % based on the amount of said dicarboxylic acid or anhydride or ester thereof.

10. The process as claimed in claim 9, wherein the amount of the cocatalyst is 0.05–0.12 mole % based on the amount of said dicarboxylic acid or anhydride or ester thereof.

11. The process as claimed in claim 1, wherein in the esterification of step (a), the molar ratio of dicarboxylic acid or anhydride or ester thereof to diol is 1.0:1.05 to 1.0:10.0.

12. The process as claimed in claim 11, wherein in the esterification of step (a), the molar ratio of dicarboxylic acid or anhydride or ester thereof to diol is 1.0:1.3 to 1.0:6.0.

13. The process as claimed in claim 1, wherein the esterification of step (A) is at a temperature of 160°–240° C. and the coversion is greater than 90%.

14. The process as claimed in claim 13, wherein the coversion is greater than 95%.

15. The process as claimed in claim 1, wherein step (b) the polycondensing is at a temperature of 250°–290° C.

16. The process as claimed in claim 15, wherein step (b) the polycondensing is at a temperature of 260°–280° C.

17. A heat resistant phosphorus-containing polymeric flame retardant having the formula:

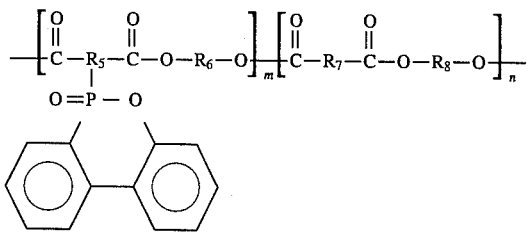

wherein $R_5$ is a $C_2$-$C_8$ alkylene or arylene, $R_6$ is a $C_2$-$C_{10}$ alkylene, $R_7$ is a $C_2$-$C_{10}$ alkylene or arylene, $R_8$ is a $C_2$-$C_{10}$ alkylene, m is an integer of 1–10, and n is an integer of 1–10.

* * * * *